United States Patent [19]

Nishida

[11] Patent Number: 4,823,760
[45] Date of Patent: Apr. 25, 1989

[54] INTERNAL COMBUSTION ENGINE CONTROLLING APPARATUS

[75] Inventor: Minoru Nishida, Amagasaki, Japan

[73] Assignee: Mitsubishi Denki Kabushiki Kaisha, Tokyo, Japan

[21] Appl. No.: 196,662

[22] Filed: May 20, 1988

[30] Foreign Application Priority Data

May 21, 1987 [JP] Japan ................................. 62-126667
May 21, 1987 [JP] Japan ................................. 62-126666

[51] Int. Cl.$^4$ ........................................... F02M 25/06
[52] U.S. Cl. ..................................... 123/571; 123/417; 123/489; 364/431.06
[58] Field of Search ............... 123/416, 417, 440, 489, 123/571; 60/276, 278; 364/431.06

[56] References Cited

U.S. PATENT DOCUMENTS

| | | | |
|---|---|---|---|
| 4,005,689 | 2/1977 | Barnard | 60/278 X |
| 4,416,239 | 11/1983 | Takase et al. | 123/571 X |
| 4,445,489 | 5/1984 | Kobayashi et al. | 123/571 |
| 4,450,808 | 5/1984 | Moriyama et al. | 123/417 |
| 4,471,745 | 9/1984 | Yoshioka et al. | 123/571 |
| 4,477,875 | 10/1984 | Suzuki et al. | 364/431.06 X |
| 4,614,175 | 9/1986 | Asayama | 123/571 |
| 4,705,009 | 11/1987 | Asayama | 123/571 |

FOREIGN PATENT DOCUMENTS 0068317  6/1978  Japan ................................. 123/571

Primary Examiner—Willis R. Wolfe
Attorney, Agent, or Firm—Oblon, Fisher, Spivak, McClelland & Maier

[57] ABSTRACT

An internal combustion engine controlling apparatus comprises an exhaust gas returning passage for adjustably returning a part of exhaust gas from an internal combustion engine, a calculating means for effecting digital calculation of a controlled quantity for the engine in response to operational conditions in the engine in accordance with a program, an oxygen sensor for detecting the concentration of oxygen in the intake air after recirculating the exhaust gas to the air intake system, and an operating means for operating the output of the oxygen sensor on the basis of data stored therein to thereby determine a controlled quantity for the engine to operate it at the optimum condition.

9 Claims, 5 Drawing Sheets

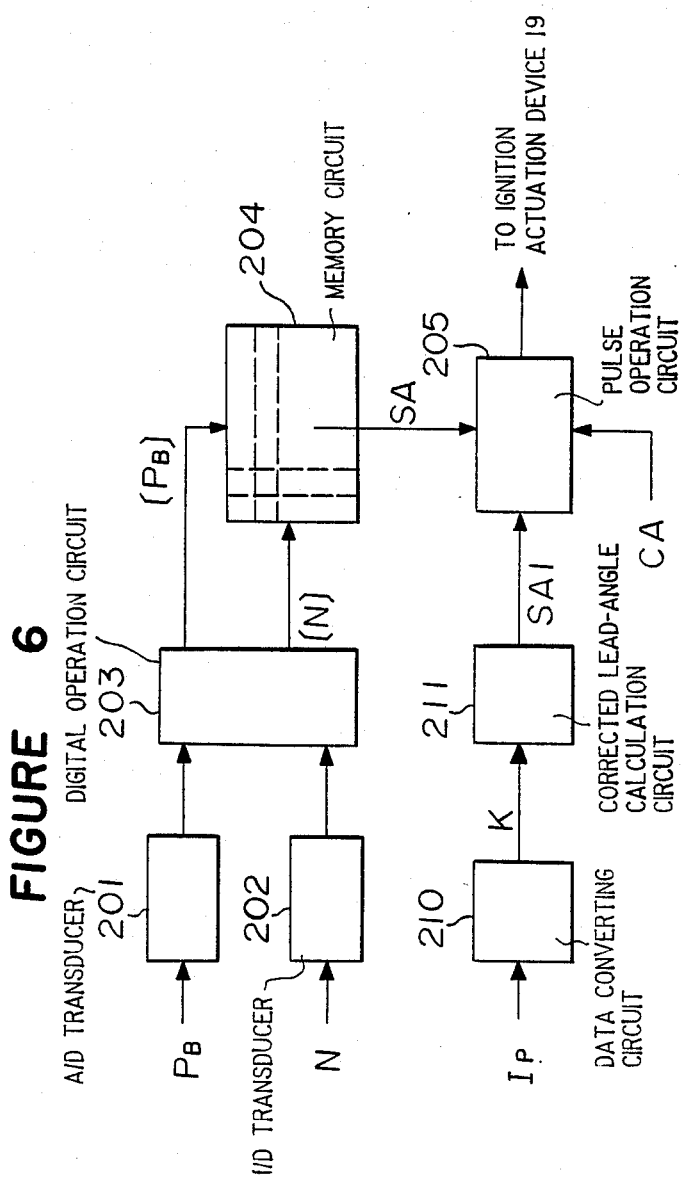

INTERNAL COMBUSTION ENGINE CONTROLLING APPARATUS

BACKGROUND OF THE INVENTION

1. Field of the Invention

The present invention relates to an internal combustion engine controlling apparatus for improving the accuracy and the reliability of controlling an internal combustion engine of a type that exhaust gas is circulated.

2. Discussion of Background

Generally, in the internal combustion engine of automobiles, controlling characteristics vary depending on operational conditions in the engine. Namely, there is change in controlled quantity such as an air-fuel ratio, ignition timing and so on when the revolution number N of the engine or a load L (such as air suction) is used as a parameter. Accordingly, it is necessary to control the controlled quantity such as ignition timing with high accuracy depending on operational conditions in the engine in order to efficiently run the engine. For this, when a micro-computer or a similar device is used, data on the controlled quantity (such as ignition lead-angle values) corresponding to the number of revolution N or load data L are stored in an ROM (read-only memory). As an example of the above-mentioned, Japanese Unexamined Patent Publication 68931/1973 discloses that the number of revolution N and load data L are memorized in the ROM as a table of a quadratic coordinate so that ignition timing for the engine is controlled on the basis of the data obtained by the table memory depending on the operational conditions of the engine.

In controlling an internal combustion engine provided with an exhaust gas recirculation device, the operational conditions of the engine change depending on an amount of exhaust gas to be recirculated. Accordingly, it is necessary to determine a controlled quantity such as ignition timing by adding data on the exhaust gas recirculation quantity. In this case, as data on the exhaust gas recirculation quantity, an amount of lifting the valve body of a control valve is used to control an amount of recirculation of the exhaust gas (hereinbelow, referred to as EGR). Or, a negative pressure of air to be supplied to a driving means is used when a negative pressure type actuator is used as a driving means for driving the control valve. Or a signal such as a driving current is used when an electric type actuator is used.

In order to obtain data on a controlled quantity such as ignition timing, the data of number of revolution N, a load L and the above-mentioned EGR are added as parameters, and the data stored in given locations in the memory are sequentially read in response to the operational conditions of the engine, whereby the controlled quantity such as the ignition timing is determined on the basis of the read data.

Generally, although detected values such as the number of revolution N and the load L (for instance, a negative pressure in an intake air system) do not substantially change with the lapse of time in the lifetime of engine, there is found a substantial change in detected values on the data E of the EGR when the value at the initial stage of use is compared with the value measured after a long time use because carbon in the exhaust gas deposits on an EGR control valve and on the wall of the duct when the engine is used for a long period. Accordingly, it is difficult to accurately control the engine because the detected values do not correspond to the actual operational conditions of the engine and because the initial value of the controlled quantity of the engine moves.

SUMMARY OF THE INVENTION

It is an object of the present invention to provide an internal combustion engine for improving accuracy and reliability in controlling operations of the engine and for increasing efficiency in fuel consumption and purification of exhaust gas even though the engine is used for a long time.

In accordance with the present invention, there is provided an internal combustion engine controlling apparatus which comprises a returning means for adjustably returning a part of exhaust gas from an internal combustion engine to an air intake system to mix it with intake air, a detecting means for detecting at least one operation parameter indicating operational conditions in the engine, an oxygen sensor for detecting the concentration of oxygen in the intake air after recirculating the exhaust gas to said air intake system, and a control means which includes a memory means to store data for determining a control parameter for the engine in response to a plurality of operational conditions in the engine, the operational conditions being defined by a calculated value obtained by the operation parameter and the oxygen concentration in said intake air and which outputs a signal for correcting the operation parameter on the basis of the data stored in the memory.

Further, in accordance with the present invention, there is provided an internal combustion engine controlling apparatus which comprises a recirculating means for adjustably recirculating a part of exhaust gas from an internal combustion engine to an air intake system to mix it with intake air, a calculating means for effecting digital calculation of a controlled quantity for the engine in response to operational conditions in the engine in accordance with a program, an oxygen sensor for detecting the concentration of oxygen in the intake air after recirculating the exhaust gas to the air intake system, and a calculation-correcting means which calculates a value related to the output of the oxygen sensor and which determines a controlled quantity for the engine on the basis of data which are obtained by correcting a value obtained by the calculating means by using the value related to the output of the oxygen sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a block diagram showing the inner structure of a computer used for another embodiment of the present invention.

DETAILED DESCRIPTION OF THE PREFERRED EMBODIMENTS

Figure 1:
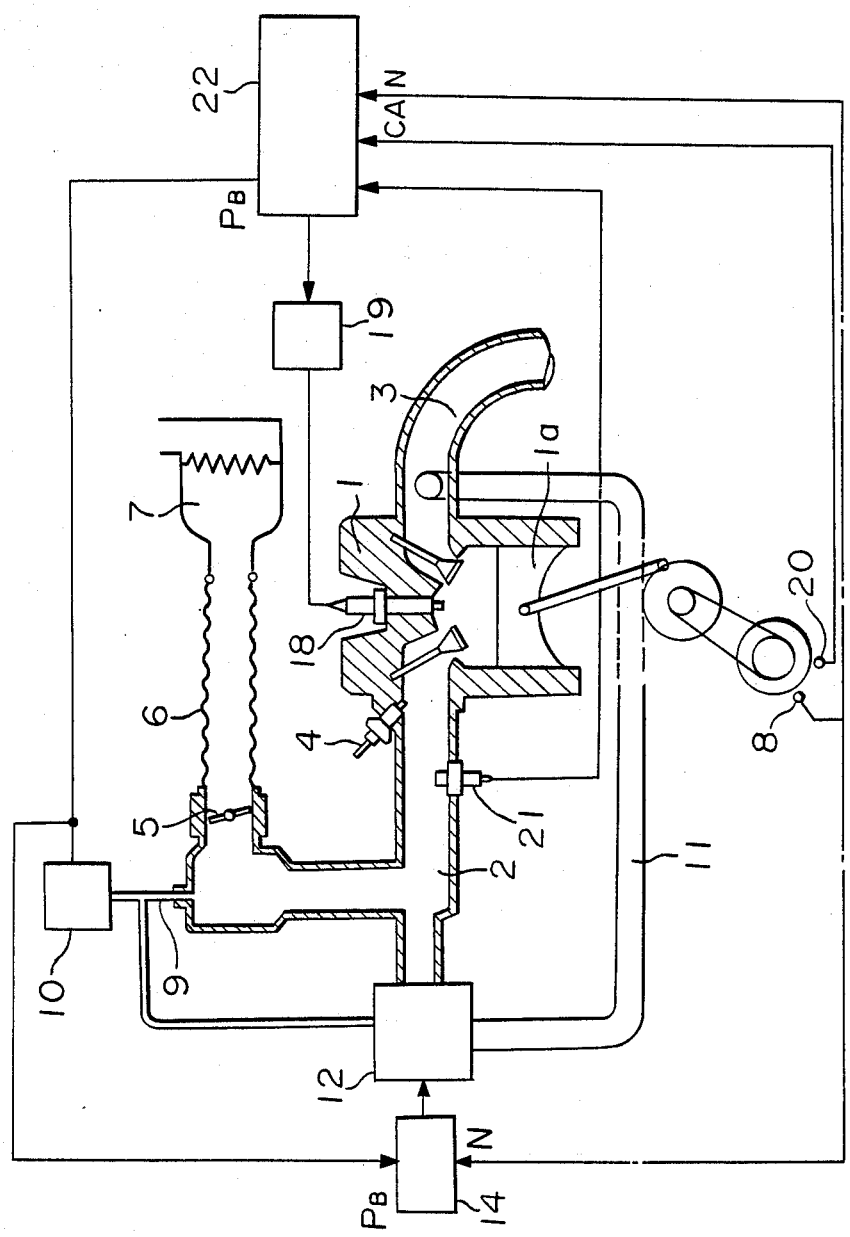
FIG. 1 is a block diagram showing an embodiment of the internal combustion engine controlling apparatus according to the present invention.

Referring to the drawings, wherein the same reference numerals designate the same or corresponding parts, and particularly to FIG. 1, there is shown an embodiment of the internal combustion engine controlling apparatus. A reference numeral 1 designates the main body of an internal combustion engine. An air duct 6 is connected to the engine main body 1 through an intake air manifold 2. An air cleaner 7 is disposed at the free end of the air duct 6. A throttle valve 5 is disposed in a predetermined position in the air duct 6.

A fuel supplying device 4 is attached to the connecting portion of the intake air manifold 2 and the engine main body 1. An exhaust manifold 3 is connected to the engine main body 1. Ignition plugs 18 are attached to the engine main body 1.

The exhaust manifold 3 is communicated with the intake air manifold 2 through an EGR passage 11 in which a control valve 12 for controlling an amount of the exhaust gas (hereinbelow, referred to as an EGR valve) is provided. In this embodiment, a pressure-operated diaphragm valve, which is actuated by a negative pressure introduced from the intake manifold is used as a driving source for the EGR valve 12.

The negative air pressure is introduced from the intake air manifold 2 through a negative pressure introducing conduit 9. An air pressure in the intake air manifold 2 is detected by a negative pressure detector 10 through the negative pressure introducing conduit 9.

The reciprocating movements of a piston 1a in the engine main body 1 is converted in a rotary motion by a crank mechanism. The revolution of the crank mechanism, i.e. the revolution of the engine is detected by an engine speed detector 8. Further, a crank angle position of the engine is detected by a crank angle sensor 20.

The output of the engine speed detector 8, i.e. a revolution speed signal N of the engine is outputted to an EGR controlling circuit 14 and a computer 22. On the other hand, the output of the crank angle sensor 20, i.e. a crank angle signal CA is outputted to a computer 22.

An oxygen sensor 21 is provided in the intake air manifold 2 to detect the concentration of oxygen, and an output from the oxygen sensor 21, i.e. an oxygen concentration signal O2 is supplied to the computer 22.

The sensor element of the oxygen sensor 21 is provided at the downstream side (at the side of the engine main body 1) of the intake air manifold 2 with respect to the opening part of the EGR passage 11. The oxygen sensor 21 may be a solid-electrolyte oxygen pump type sensor in which a current output (mA) is produced in proportion to the concentration of oxygen, as proposed, for instance, in Japanese Unexamined Patent Publication 153155/1983. The output of the negative pressure detector 10 which detects the pressure of air in the intake air manifold 2, i.e. an intake air pressure signal PB is supplied to the computer 22 and the EGR control circuit 14. The EGR control circuit 14 is so adapted to adjust the EGR valve 12 so that the EGR rate is changed to a predetermined value in response to the negative air pressure and the engine speed.

The computer 22 is composed mainly of a microcomputer which receives the input signals, as described above such as the engine speed signal N, the crank angle signal CA, the oxygen concentration signal O2, the intake air pressure signal PB detected at the downstream of the throttle valve 5.

The computer 22 produces an electric signal to an ignition plug actuating device 19, namely, an electric pulse corresponding to a current conduction time to ignition coils.

The ignition plug actuating device 19 for generating electric sparks to the ignition plugs 18 is constituted by pe g .00the known ignition coils and power transistors for switching on/off energizing the ignition coil.

The ignition coil 18 generates ignition sparks to a gas mixture in a cylinder in the engine main body 1.

The construction of the EGR control circuit will be described in detail with reference to FIG. 2. The intake air pressure signal PB is inputted from the negative pressure detector 10 to an A/D(analog/digital) transducer 101. The engine speed signal N is inputted from the engine speed detector 8 to an f/D(frequency/digital) transducer 102.

The outputs of the A/D transducer 101 and the f/D transducer 102 are respectively supplied to a digital operation circuit 103 in which the outputs are transformed into digital values, which are outputted to a memory circuit 104 as reading instruction signals [PB], [N].

The output of the memory circuit 104 is supplied to the pulse operation circuit 105, and the output of the pulse operation circuit 105 is outputted to the EGR control valve 12.

Figure 5:
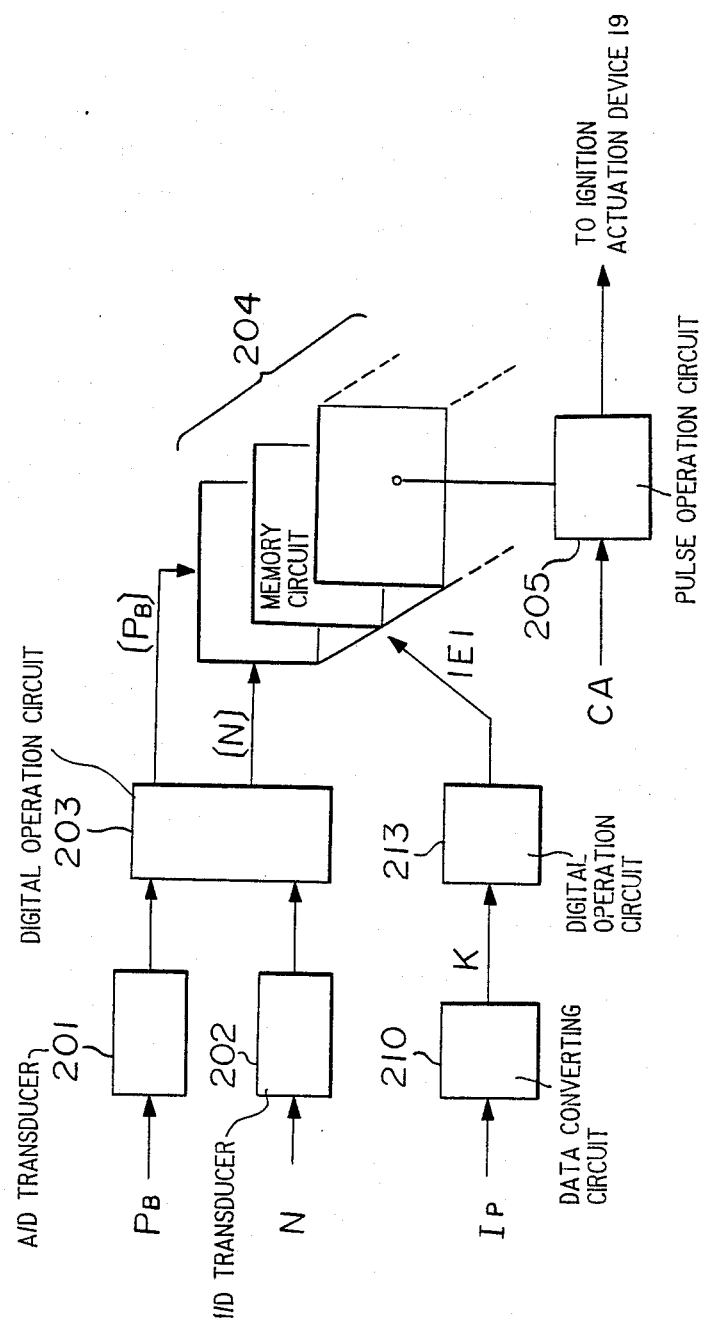
FIG. 5 is a diagram showing the inner structure of of a computer used for the above-mentioned embodiment.

FIG. 5 shows the inner structure of the computer 22. In FIG. 5, the A/D transducer 201 is adapted to receive the intake air pressure signal PB, and the f/D transducer 202 is adapted to receive the engine speed signal N from the engine speed detector 8.

The A/D transducer 201 and the f/D transducer 202 are respectively so adapted to receive input signals to convert them in digital signals, which are supplied to a digital operation circuit 203, whereby the reading instruction signals [PB], [N] are respectively outputted to a memory circuit.

On the other hand, a data converting circuit 210, which may be formed of a digital circuit or an analog circuit, is so adapted to receive an output IP from the oxygen sensor 21 to calculate an EGR rate K to thereby supply it to a digital operation circuit 213.

The digital operation circuit 213 receives the EGR rate K to output a reading instruction signal [E] to the memory circuit 204.

Explanation of the data stored in the memory circuit 204 will be made hereinafter with reference to the operation of it. The output of the memory circuit 204 is supplied to a pulse operation circuit 205 which is, in turn, so adapted that it receives the output CA of the crank angle sensor 20 to thereby output a pulse signal as a reference angle signal 5 which determines a current conduction time for an ignition coil to the ignition coil actuating device 19.

The operation of the internal combustion engine controlling apparatus of the present invention will be described.

Figure 2:
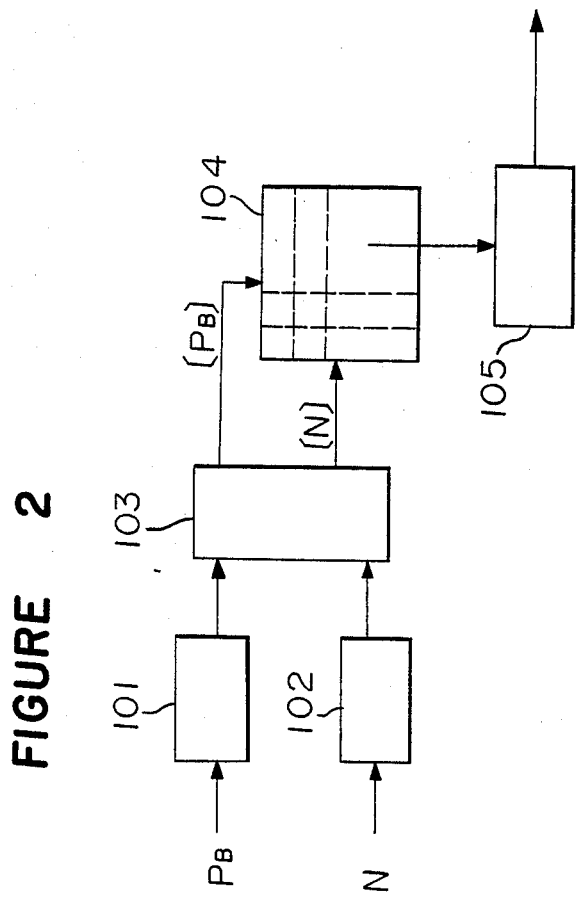
FIG. 2 is a block diagram showing the inner structure of an EGR controlling circuit used for the apparatus as shown in FIG. 1.

First of all, explanation on controlling the EGR rate is made with reference to FIG. 2. The intake air pressure signal PB outputted from the negative pressure detector 10 is inputted into the A/D transducer 101 to be transformed in a digital quantity in accordance with a predetermined treatment.

The engine speed signal N from the engine speed detector 8 is inputted into the f/D transducer 102 to be transformed into a digital signal.

The digital operation circuit 103 receives the outputs of the A/D transducer 101 and the f/D transducer 102 to perform digitally filtering treatment of the digital data to thereby output the reading instruction signals [N] and [PB] to the memory circuit 104.

The memory circuit 104 stores data by which a signal to be outputted to the EGR control valve 12 in engine conditions which are defined in the two dimensional space of the engine speed N and the intake air pressure PB, is determined. Namely, the data correspond to a time ratio in opening and closing the EGR control valve 12, when the EGR control valve 12 is of a type operable by a negative pressure diaphragm, and a negative pressure applied to the diaphragm is controlled by the time ratio in opening and closing a solenoid valve.

When the reading instruction signals [PB], [N] corresponding to the engine speed signal N and the intake air pressure signal PB are inputted into the memory circuit 104, the above-mentioned data is read to be supplied to the pulse operation circuit 105. The pulse operation circuit 105 generates a pulse signal having a time ratio corresponding to the data stored in the memory circuit, and the pulse signal is inputted in the EGR control valve 12, whereby control of the EGR rate is conducted in response to the operational conditions of the engine.

The operation of the major components constituting the internal combustion engine controlling apparatus according to this invention will be described with reference to FIGS. 3–5.

Figure 3:
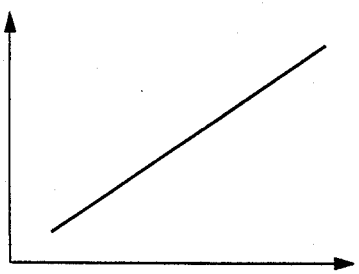
FIG. 3 is a diagram showing a relation of an output Ip generated from an oxygen sensor to a detected concentration of oxygen $Co_2$ to illustrate the operation of the above-mentioned embodiment.

FIG. 3 is a characteristic diagram showing a relation of the concentration of oxygen Co2 to the output Ip of the oxygen sensor 21. The output IP of the oxygen sensor 21 is inputted in the computer 22 in which the concentration of oxygen is calculated.

Figure 4:
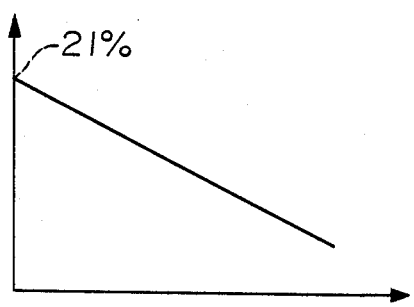
FIG. 4 is a diagram showing a relation of an EGR rate K to the concentration of oxygen Co2 of the above-mentioned embodiment.

FIG. 4 is a characteristic diagram showing a relation of the concentration of oxygen Co2 to the EGR rate (a raio of an amount of EGR to an amount of air to be supplied to the engine). Calculation of the concentration of oxygen Co2 is carried out in accordance with the characteristic diagram of FIG. 3, and then, the EGR rate K is calculated in the computer 22 in accordance with the characteristic diagram of FIG. 4.

In FIG. 5, processing of the intake air pressure signal PB and the engine speed signal N is conducted in the computer 22 in the same manner as described with reference to, the EGR control circuit 14. In FIG. 5, the data converting circuit 210 calculates the EGR rate K from the output Ip of the oxygen sensor 21, and the value obtained by the calculation is supplied to the digital operation circuit 213.

On receiving the signal of EGR rate K, the digital operation circuit 213 outputs the reading instruction signal [E] to the memory circuit 204.

The memory circuit 204 stores data by which determination is made as to ignition timing in the engine conditions quadratically defines by the EGR rate K in addition to the engine speed N and the intake air pressure PB.

When the reading instruction signals [PB], [N], [E] concerning the engine revolution speed N, the intake air pressure signal PB and the EGR rate K are inputted in the memory circuit 204, data stored in the memory circuit 204 at the positions corresponding to these reading instruction signals are read out so that they are supplied to the pulse operation circuit 205.

The pulse operation circuit 205 generates a pulse signal to the ignition coil actuating device 19 by using an output signal CA from the crank angle sensor 20 as a reference angle signal so that ignition sparks are produced in the ignition plugs 18 at a predetermined ignition timing.

As described above, in accordance with the present invention, accurate control of parameters for controlling the internal combustion engine equipped with EGR is obtainable without causing substantial change in the control characteristic even though the engine is used for a long time. Further, purification of exhaust gas and saving fuel are also attainable.

The second embodiment of the internal combustion engine controlling apparatus according to the present invention will be described.

The construction of the second embodiment is the same as the first embodiment shown in FIGS. 1–5 except for the inner construction of a computer as shown in FIG. 6. Namely, description concerning the construction as shown in FIG. 1, the circuit the EGR control circuit as shown in FIG. 2 and the calculation of the EGR rate K with reference to FIGS. 3 and 4 can apply the second embodiment, and therefore, description of these portions will be omitted.

The unique construction of the second embodiment will be explained with reference to FIG. 6.

In FIG. 6, the processing operations for the intake air pressure signal PB and the engine revolution speed signal N as parameters indicating the operational conditions of the engine, and the memory circuit for storing the values obtained by the processing operations are the same as those described with reference to FIG. 5.

The output IP of the oxygen sensor 21 is inputted to the data converting circuit 210. The operation converting circuit 210 calculates the EGR rate K from the output IP, and thus obtained EGR rate K is supplied to a corrected lead-angle calculation circuit 211 which may be formed of a digital circuit or an analog circuit.

The corrected lead-angle calculation circuit 211 calculates a corrected lead-angle data SA1 on the basis of EGR rate K, and thus obtained data are outputted to the pulse operation circuit 205.

The pulse operation circuit 205 receives the output data SA of the memory circuit 204, the output SA1 of the corrected lead-angle calculation circuit 211 and the output CA of the crank angle sensor 20. The output CA is supplied to the ignition actuating device 19 as a reference angle signal.

The operation of the second embodiment of the present invention will be described.

In FIG. 6, the data converting circuit 210 calculates the EGR rate K on the basis of the output IP of the oxygen sensor 21 in the same manner as the description with reference to FIGS. 3 and 4.

The memory circuit 204 stores data which determines ignition timing under, the operational conditions of the engine defined in the two dimensional space of the engine revolution speed signal N and the intake air pressure signal PB in the same manner as the memory circuit 104 in FIG. 2.

On starting the engine, the signal PB of the negative pressure detecting device 10 and the signal N of the engine revolution speed detecting device 8 are respectively inputted to the A/D transducer 201 and the f/D transducer 202. The signals are operated in the digital operation circuit 203 whereby the reading instruction signals, are respectively outputted. The reading instruction signals [PB], [N] are supplied to the memory circuit 204, a data signal SA (SA: spark angle) for determining ignition timing is supplied from the memory circuit 204 for a predetermined time.

On the other hand, an output signal IP is supplied to the data converting circuit 210 in response to change in the concentration of oxygen in the intake air which changes depending on the actual EGR rate during the data of the engine. The operation converting circuit 210 performs conversion of the input signal IP into the concentration of oxygen Co2, and further to the EGR rate K, and then, a signal indicating the EGR rate K is supplied to the corrected lead-angle calculation circuit 211 in which a corrected quantity for the ignition timing is calculated.

The corrected lead-angle calculation circuit 211 operates the EGR rate K in accordance with a previously stored calculating formula to obtain a corrected lead-angle data SA1. Alternatively, the corrected lead-angle calculation circuit may be formed of a digital circuit which is so adapted that some corrected lead-angle data corresponding to some of the EGR rate K are previously stored in a memory circuit, and when a signal indicating an EGR rate K is inputted, a value stored in the memory circuit at the position corresponding, to the inputted, signal is read to thereby obtain a corrected lead-angle data SA1.

The pulse operation circuit 205 determines ignition timing on the basis of the data signal SA from the memory circuit 204 and the data signal SA1 from the corrected lead-angle calculation circuit 211. In accordance with the ignition timing thus determined, a pulse signal which uses the output signal CA from the crank angle sensor 20 as a reference angle signal is outputted to the ignition actuating device 19, so that the ignition plugs 18 produce ignition sparks.

In accordance with the second embodiment of the present invention, a controlled quantity for the internal combustion engine in which a part of the exhaust gas in the engine is adjustably returned to the intake air system is corrected on the basis of a signal from the oxygen sensor disposed in the intake air system. Accordingly, accurate, control of the engine equipped with EGR system is obtainable without causing substantial change in the control characteristic.

In the above-mentioned embodiments, the ignition timing is used as the parameter for controlling the engine. However, a parameter of an air-fuel ratio may be used for controlling. In this case, same effect can be obtained.

Obviously, numerous modifications and variations of the present invention are possible in the light of the above teachings. It is therefore to be understood that within the scope of the appended claims, the invention may be practiced otherwise than as specifically described herein.

What is claimed is:

1. An internal combustion engine controlling apparatus which comprises:
    a recirculating means for adjustably returning a part of exhaust gas from an internal combustion engine to an air intake system to mix it with intake air,
    a detecting means for detecting at least one operation parameter indicating operational conditions in said engine,
    an oxygen sensor for detecting the concentration of oxygen in said intake air after recirculating said exhaust gas to said air intake system, and
    a control means which includes a memory means to store data for determining a control parameter for said engine in response to a plurality of operational conditions in the engine, the operational conditions being defined by a calculated value obtained by said operation parameter and said oxygen concentration in said intake air, and which outputs a signal for correcting said operation parameter on the basis of said data stored in said memory.

2. The engine controlling apparatus according to claim 1, wherein said operation parameter is the revolution speed of said engine and a negative pressure in said air intake system.

3. The engine controlling apparatus according to claim 1, wherein said operation parameter is the revolution speed of said engine and the degree of opening of a throttle valve.

4. The engine controlling apparatus according to claim 1, wherein said operation parameter is a flow rate of air sucked into said engine.

5. The engine controlling apparatus according to claim 1, wherein said control parameter is ignition timing.

6. An internal combustion engine controlling apparatus which comprises:
    a recirculating means for adjustably returning a part of exhaust gas from an internal combustion engine to an air intake system to mix it with intake air,
    a calculating means for effecting digital calculation of a controlled quantity for said engine in response to operational conditions in said engine in accordance with a program,
    an oxygen sensor for detecting the concentration of oxygen in said intake air after recirculating said exhaust gas to said air intake system, and
    a calculation-correcting means which calculates a value related to the output of said oxygen sensor and which determines a controlled quantity for said engine on the basis of data which are obtained by correcting a value obtained by said calculating means by using said value related to the output of the oxygen sensor.

7. The engine controlling apparatus according to claim 6, wherein, said calculation-correcting means comprises a data converting circuit for converting the output of said oxygen sensor into an EGR rate, a corrected lead-angle calculation circuit which receives the output of said converting circuit and outputs a corrected lead-angle data signal by operating said output of said converting circuit on the basis of said data, and a pulse operation circuit to receive said corrected lead-angle data signal and the output of calculating means to generate an ignition timing determining signal.

8. The engine controlling apparatus according to claim 7, wherein said pulse operation circuit generates a reference angle signal by receiving an output from a crank angle sensor.

9. The engine controlling apparatus according to claim 1 wherein said control parameter is air to fuel ratio.

* * * * *